US008526157B2

(12) United States Patent
Zimmermann

(10) Patent No.: US 8,526,157 B2
(45) Date of Patent: Sep. 3, 2013

(54) SURGE ARRESTER AND ARRANGEMENT OF A PLURALITY OF SURGE ARRESTERS TO FORM AN ARRAY

(75) Inventor: Gero Zimmermann, Neuenhof (CH)

(73) Assignee: EPCOS AG, Munich (DE)

( * ) Notice: Subject to any disclaimer, the term of this patent is extended or adjusted under 35 U.S.C. 154(b) by 76 days.

(21) Appl. No.: 13/194,218

(22) Filed: Jul. 29, 2011

(65) Prior Publication Data

US 2012/0019972 A1 Jan. 26, 2012

Related U.S. Application Data

(63) Continuation of application No. PCT/EP2010/050793, filed on Jan. 25, 2010.

(30) Foreign Application Priority Data

Jan. 29, 2009 (DE) ......................... 10 2009 006 545

(51) Int. Cl.
*H02H 1/00* (2006.01)
*H02H 1/04* (2006.01)
*H02H 3/22* (2006.01)
*H02H 9/06* (2006.01)

(52) U.S. Cl.
USPC ........................................... 361/118; 361/117

(58) Field of Classification Search
USPC .......................................................... 361/118
See application file for complete search history.

(56) References Cited

U.S. PATENT DOCUMENTS

| | | | | |
|---|---|---|---|---|
| 2,365,518 | A | 12/1944 | Berkley et al. | |
| 2,431,226 | A | 11/1947 | Berkley et al. | |
| 2,891,194 | A * | 6/1959 | McStrack et al. | 315/36 |
| 4,345,293 | A | 8/1982 | Hasse et al. | |
| 8,169,145 | B2 * | 5/2012 | Boy et al. | 313/631 |
| 2007/0064372 | A1 | 3/2007 | Loader et al. | |
| 2008/0218082 | A1 | 9/2008 | Boy et al. | |
| 2010/0051437 | A1 * | 3/2010 | Kruska et al. | 200/502 |
| 2010/0156264 | A1 | 6/2010 | Boy et al. | |

FOREIGN PATENT DOCUMENTS

| | | | |
|---|---|---|---|
| DE | 29 34 237 | A1 | 3/1981 |
| DE | 101 40 950 | A1 | 2/2003 |
| DE | 297 24 817 | U1 | 4/2004 |
| DE | 10 2005 036 265 | A1 | 2/2007 |
| DE | 10 2008 029 094 | A1 | 1/2009 |
| WO | WO 03/012945 | A1 | 2/2003 |

* cited by examiner

*Primary Examiner* — Dharti Patel
(74) *Attorney, Agent, or Firm* — Slater & Matsil, L.L.P.

(57) ABSTRACT

A surge arrester includes a gas-filled closed arrester body that is formed by a first annular ceramic body and two electrodes at a distance from one another. A second annular ceramic body is arranged in the interior of the arrester body and is at a distance from the first ceramic body and has a physical height that is less than the physical height of the first ceramic body.

19 Claims, 1 Drawing Sheet

SURGE ARRESTER AND ARRANGEMENT OF A PLURALITY OF SURGE ARRESTERS TO FORM AN ARRAY

This application is a continuation of co-pending International Application No. PCT/EP2010/050793, filed Jan. 25, 2010, which designated the United States and was not published in English, and which claims priority to German Application No. 10 2009 006 545.8, filed Jan. 29, 2009, both of which applications are incorporated herein by reference.

BACKGROUND

German patent document DE 10 2005 036 265 A1 discloses a surge arrester.

SUMMARY OF THE INVENTION

In one aspect, the present invention specifies a simple surge arrester that can be produced cost-effectively and has a high consequential current load capability.

A surge arrester is specified which comprises a gas-filled closed arrester body which is formed by an annular ceramic body and two electrodes which are at a distance from one another. A second annular ceramic body is arranged in the interior of the arrester body and is at a distance from the first ceramic body. The second ceramic body has a physical height which is less than the physical height of the first ceramic body.

In one embodiment of the surge arrester, at least one inner face of the electrodes of the arrester is arranged partially within a cylindrical area which is defined by the internal dimensions of the second ceramic body.

At least one inner face of the electrode, which is arranged within the cylindrical area, is preferably in the form of a planar surface which may have a rhomboid pattern.

In one embodiment of the surge arrester, the electrodes are in the form of pin electrodes.

In a further embodiment, the inner faces of the electrodes are designed such that they have at least two planar surfaces which are arranged parallel to one another.

An activation compound can be applied in places to the inner faces of the electrodes. The activation compound is preferably arranged in the area of the planar surfaces of the inner faces of the electrodes, and covers them partially or completely.

In one embodiment of the surge arrester, one or more trigger strips is or are arranged on or applied to the inner face of the first ceramic body.

The use of trigger strips on the inner surfaces of the first ceramic body and the application of an activation compound to the electrodes makes it possible to optimize or influence the trigger behavior and the load capability of the surge arrester.

The second ceramic body of the surge arrester is preferably designed such that the majority of the evaporation products of electrode material or of materials of the activation compound or of the trigger strips, which can occur as a consequence of a current load on the surge arrester, is deposited on the inner face of the second ceramic body. This prevents vapor deposition or depositing of the evaporation product residues on the inner wall of the first ceramic body, thus ensuring a sufficiently high isolation level and a sufficiently low trigger voltage of the surge arrester throughout its entire life. Evaporation product residues on the inner face of the first ceramic body could lead to isolation faults and to deactivation of the trigger strips, which would result in the deterioration in the response of the surge arrester.

In one embodiment, the material of the first and second ceramic bodies comprises an aluminum oxide ceramic ($Al_2O_3$).

The electrodes of the surge arrester preferably have high thermal conductivity and a high melting temperature. In one preferred embodiment of the surge arrester, the electrodes are composed of tungsten copper (WCu).

The electrodes preferably have a diameter of less than 10 mm.

In one embodiment, the arrester has a power density of more than 130 W/mm$^3$ in the event of a consequential current.

Surge arresters described above can be arranged in an array which comprises at least two surge arresters as described above, wherein two directly adjacent surge arresters in the array have a common electrode.

In one embodiment, the arrangement is designed such that the common electrode is in the form of a pin electrode which is used on both sides.

Surge arresters are mechanically firmly connected to one another. After the final soldering, during which a gas mixture of high thermal conductivity and with a breakdown strength which can be adjusted easily depending on the pressure is preferably used, this therefore results in hermetically sealed, gas-filled surge arresters with static and dynamic trigger characteristics which are set in a defined manner, a high burning voltage and a very high power density in the event of a consequential current load.

An array as described above may, for example, prospectively have a consequential current capability for the overall arrangement of $\geqq$30 kA, for example, if the array comprises a total of 18 surge arresters, which are connected in series or together form a compact series circuit.

The use of simple basic elements which can easily be arranged in a row and of a surge arrester design as described above therefore makes it possible to achieve a considerable cost and volume reduction for the overall arrangement, in comparison to comparable surge arresters without a second, inner ceramic body. A volume reduction of more than 40% is possible.

The arrangement as described above of a plurality of surge arresters is preferably used between an outer conductor and a neutral conductor in main electrical power supply systems for structural installations.

The subject matter described above and the arrangement will be explained in more detail using the following figures and exemplary embodiments.

BRIEF DESCRIPTION OF THE DRAWINGS

The drawings described in the following text should not be considered as being true to scale, and in fact the individual dimensions in the illustrations may be illustrated enlarged, reduced or else distorted. Elements which carry out the same functions as one another or are identical are annotated with the same reference symbols.

Figure 1:
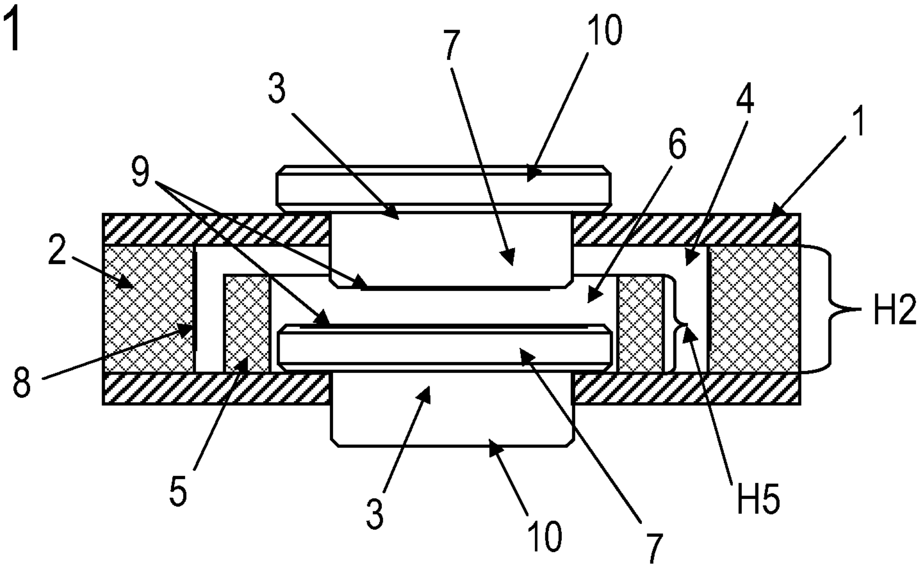
FIG. 1 shows a schematic design of a single surge arrester.

The following list of reference symbols may be used in conjunction with the drawings:

1 Arrester body

2 First ceramic body

3 Electrode

4 Interior of the arrester body 1

5 Second ceramic body

H2 Height of the first ceramic body

H5 Height of the second ceramic body

6 Cylindrical area which is defined by the internal dimensions of the second ceramic body 5

Inner face of the electrode 3

Trigger strip

9 Activation compound

10 Outer face of the electrode 3

DETAILED DESCRIPTION OF ILLUSTRATIVE EMBODIMENTS

FIG. 1 shows a schematic design of a surge arrester. Surge arrester has an arrester body 1 which has a first ceramic body 2. The surge arrester has two electrodes 3 which, in the illustrated embodiment, are in the form of pin electrodes. Each of the electrodes 3 has an electrode body which has an outer face 10 and an inner face 7. The inner face 7 of the electrodes 3 is partially coated with an activation compound 9. The inner faces 7 of the electrodes 3 which are arranged opposite preferably have surfaces which are arranged parallel to one another. In the figures, the outer face 10 of the electrodes 3 is arranged outside the surge arrester. On its outer face 10, each of the electrode bodies has the same shape as the inner face 7 of the opposing electrode, and is therefore particularly highly suitable for connecting the surge arresters in series. The electrode bodies are therefore identical and integral. A second ceramic body 5 is arranged in the interior 4 of the surge arrester, which is defined by the internal dimensions of the first ceramic body 2. The first ceramic body 2 has a height H2 which is greater than the height H5 of the second ceramic body 5. The inner faces 7 of the electrodes 3 project into a cylindrical area 6, which is defined by the internal dimensions of the second ceramic body 5. Trigger strips 8 are arranged on the inner face of the first ceramic body 2. The second ceramic body 5 of the surge arrester is designed such that the majority of evaporation products of material of the electrodes 3 and of materials of the activation compound 9 or of the trigger strips 8, which can occur as a consequence of a current load on the surge arrester, is deposited on the inner face of the second ceramic body 5. This prevents vapor deposition or depositing of the evaporation product residues on the inner wall of the first ceramic body 2.

Figure 2:
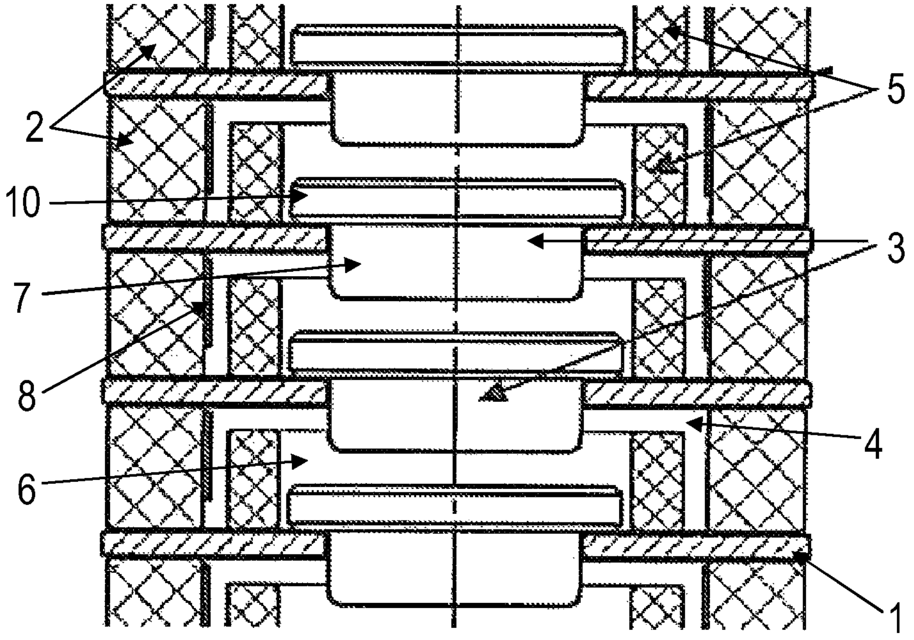
FIG. 2 shows an arrangement of a plurality of surge arresters which have a common electrode.

FIG. 2 shows a detail of an arrangement of a plurality of surge arresters which are arranged to form an array. Each of the surge arresters has an arrester body 1 which has a first ceramic body 2. The arrester body 1 has an interior 4 which is defined by the internal dimensions of the first ceramic body 2. Trigger strips 8 are arranged on the inner face of the first ceramic body 2. A second ceramic body 5 is arranged in the interior 4 of the arrester body 1. Two directly adjacent surge arresters have a common electrode 3. The electrode 3 is designed such that one face of the electrode 3 forms an inner face 7 of an electrode 3 of a first surge arrester. The inner face 7 of the electrode 3 projects at least partially into the cylindrical area 6, which is defined by the internal dimensions of the second ceramic body 5 of the surge arrester. The second face of the electrode 3 forms the outer face 10 of the electrode 3 of the first surge arrester, and at the same time projects as the inner face 7 of the electrode 3 into the cylindrical area 6 of a second adjacent surge arrester. The individual surge arresters are mechanically firmly connected to one another, with the arrester body 1 being filled with a gas mixture of high thermal conductivity and with a breakdown resistance which can easily be adjusted as a function of the pressure.

Although it has been possible to describe only a limited number of possible developments of the invention in the exemplary embodiments, the invention is not restricted to these developments. In principle, it is possible for the surge arresters to have electrodes of virtually any desired form.

The description of the subjects indicated here is not limited to the individual specific embodiments. In fact, the features of the individual embodiments can be combined with one another as required, while technically worthwhile.

What is claimed is:

1. A surge arrester comprising:

a gas-filled closed arrester body, which is formed by a first annular ceramic body and two electrodes that are spaced from one another; and a second annular ceramic body arranged within an interior of the gas-filled closed arrester body, the second annular ceramic body having a radial distance from the first annular ceramic body.

2. The surge arrester according to claim 1, wherein at least one inner face of one of the electrodes is arranged partially within a cylindrical area that is defined by internal dimensions of the second ceramic body.

3. The surge arrester according to claim 2, wherein the at least one inner face of the electrodes comprises a planar surface which comprises a rhomboid pattern.

4. The surge arrester according to claim 1, wherein the electrodes comprise pin electrodes.

5. The surge arrester according to claim 1, wherein the electrodes each have at least two planar inner faces which are arranged parallel to one another.

6. The surge arrester according to claim 5, further comprising an activation compound applied to at least portions of the inner faces of the electrodes.

7. The surge arrester according to claim 6, wherein the second ceramic body is designed such that a majority of evaporation products of electrode material and/or the activation compound is deposited on an inner face of the second ceramic body as a consequence of a current load on the surge arrester.

8. The surge arrester according to claim 1, further comprising trigger strips applied to an inner face of the first ceramic body.

9. The surge arrester according to claim 1, wherein the first ceramic body and the second ceramic body are composed of $Al_2O_3$.

10. The surge arrester according to claim 1, wherein the electrodes contain WCu.

11. An arrangement of a plurality of surge arresters to form an array, the arrangement comprising at least two surge arresters according to claim 1, wherein two directly adjacent surge arresters have a common electrode.

12. The arrangement according to claim 11, wherein the common electrode comprises a pin electrode which is used on both sides.

13. The arrangement according to claim 12, wherein the at least two surge arresters are mechanically firmly connected to one another.

14. The arrangement according to claim 1, wherein the second annular ceramic body has a physical height which is less than a physical height of the first annular ceramic body.

15. A surge arrester comprising:

a gas-filled closed arrester body, which is formed by a first annular ceramic body and two electrodes that are spaced from one another, wherein the electrodes comprise pin electrodes; and a second annular ceramic body arranged in an interior of the arrester body at a distance from the first ceramic body, the second annular ceramic body having a physical height which is less than a physical height of the first ceramic body.

16. The surge arrester according to claim 15, wherein at least one inner face of one of the electrodes is arranged partially within a cylindrical area that is defined by internal dimensions of the second ceramic body.

17. The surge arrester according to claim 15, wherein the electrodes each have at least two planar inner faces which are arranged parallel to one another.

18. An arrangement of a plurality of surge arresters to form an array, the arrangement comprising:

at least two surge arresters, each surge arrester comprising a gas-filled closed arrester body that is formed by a first annular ceramic body and two electrodes that are spaced from one another; and a second annular ceramic body arranged in an interior of the arrester body at a distance from the first ceramic body, the second annular ceramic body having a physical height which is less than a physical height of the first ceramic body;

wherein two directly adjacent surge arresters have a common electrode; and wherein the common electrode comprises a pin electrode which is used on both sides.

19. The arrangement according to claim 18, wherein the at least two surge arresters are mechanically firmly connected to one another.

* * * * *